D. W. SHARES.
Cultivator.

No, 11,460. Patented Aug. 1, 1854.

UNITED STATES PATENT OFFICE.

DANIEL W. SHARES, OF HAMDEN, CONNECTICUT.

IMPROVEMENT IN CULTIVATORS.

Specification forming part of Letters Patent No. 11,460, dated August 1, 1854.

*To all whom it may concern:*

Be it known that I, DANIEL W. SHARES, of Hamden, in the county of New Haven and State of Connecticut, have invented a certain new and useful Improvement in Hoeing-Machines, of which the following is a full, clear, and exact description, reference being had to the accompanying drawings, which form part of this specification, and in which—

Figure 1:
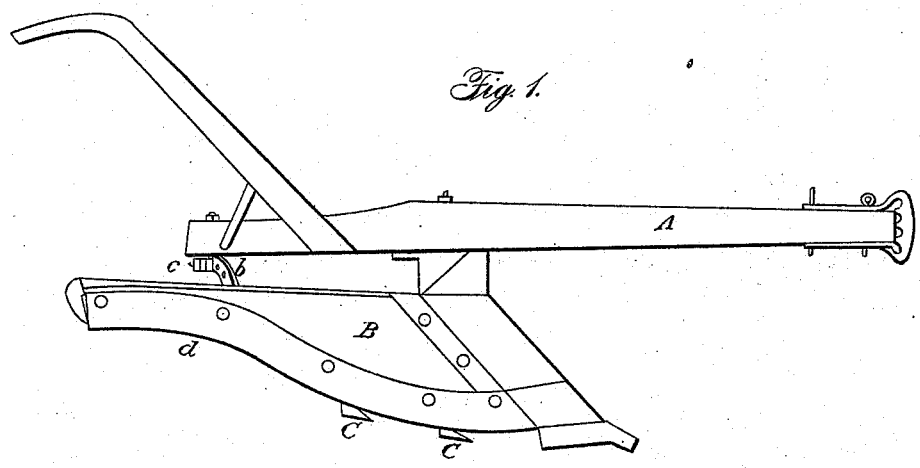
Figure 2:
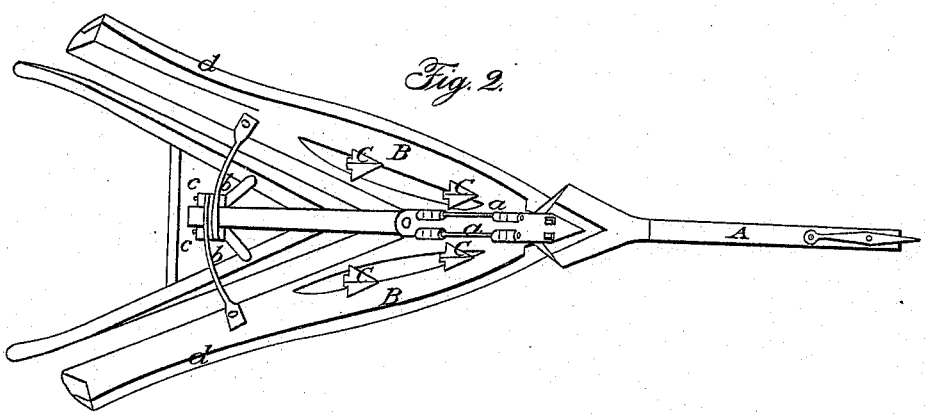
Figure 3:
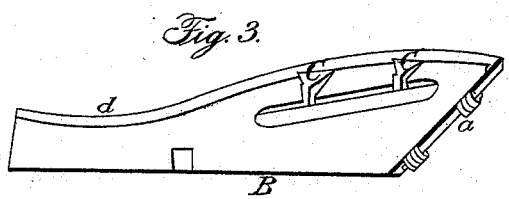

Figure 1 represents a side view of my improved machine; Fig. 2, an inverted plan or under view, and Fig. 3 an inside view of one of the wings or scrapers detached.

The machine represented in the accompanying drawings is of plow form or build, and is designed to be used in hoeing corn, potatoes, or other vegetable produce growing in hills or rows. It is drawn by horse or cattle in front, and guided or held by hand behind, as in operating the ordinary plow, the horse being hitched to the draft-bar A and walking in between the hills or rows. Thus operating, the hoeing is effected by wings or scrapers B, one on either side, diverging or spreading outward, backwardly, and set inclined or beveled on their outside faces, so as to present greater width or distance apart between their bottom than their top edges. These wings are hinged at their front ends by hinges $a$, for the purpose of contracting and expanding them at pleasure, to suit different widths of furrows or distances apart of the rows or hills, screw-bolts $c$ or pins passing through bars $b$ at the back, provided with suitable perforations, and lapping one over the other, serving to hold the wings apart when set. This arrangement of expanding and contracting wings is common to corn-plows having wings on either side, as with mine, but of different shape and for a different purpose. In the machine represented in the drawings the wings B are made much deeper at their front than their back ends, the latter having a crook or hollow, $d$, along or in its bottom edge, and gradually blending into a convex figure, which is the shape of the forward part of the bottom edge of the wing, the forward portion of the wing descending into the furrow, and serving, by its convex form, to shape it, while the crook at the back end, by its higher elevation and shape, flats or forms the rows or hills of the proper shape at the top, leaving, as the machine is drawn along, the hills or rows as perfectly formed as is commonly done in hoeing them by hand after the travel of the ordinary plow or cultivator between them, the entire bottom or scraping edge of each wing being of corresponding configuration to the transverse section of one-half (nearly) of the row and its furrow, and thus the two wings combined shape the furrow and one-half of each row on either side, the return or run of the machine along the adjoining furrows serving to hoe the opposite sides of the rows and simultaneously to hoe the one side of an adjoining row and shape the furrow as before. If the plant be in hills instead of rows, the wings similarly act in shaping them by running the machine breadthwise as well as lengthwise or diagonally, as may be, of the field between the hills. Thus the machine not only loosens the earth by its plow form in front, but carries or shoves the earth onto the rows or around the hills, leaving the hills or rows of the proper shape, answering most effectually the purpose of a hoe, as the narrow crooked form of the hinder extremity of the wings will work under the leaves of the plant lying on or near the ground instead of covering them with soil, as is the case with the common plow or cultivator, all after hand-hoeing being dispensed with. The flat shape given to the hill or row at the top by the crook in the hinder extremity of the wing will serve to make the hill or row preserve its form better than if a sharp incline or angle were left, as is the case with the common plow or cultivator.

To prevent the furrow being made or left too hard by the wings or scrapers in passing along the furrow by the weight of the machine thrown therein or on, which is more particularly apt to be the case in wet land, I attach cultivator-teeth C on the inside of the expanding wings. These teeth may be of the ordinary cultivator form, or they may be of any other suitable shape and be arranged in pairs on either wing, one tooth in advance of the other, and the back teeth of the two wings farther apart than the forward ones, as represented in the drawings, or two teeth, one to either wing, alone may be used; or a series of teeth, as desired. These cultivator-teeth may either be fastened permanently to the wings, projecting downward on their inside to or below the lower edges of the wings or scrapers; or they may be fast to a loose timber or plate secured at pleasure to the wings for the convenience of detaching them when their use is not requisite, or be otherwise secured to the wings. The use of them is, as before specified, to prevent the furrow being made too hard by the travel of the machine in it, by breaking up and loosening the top-hardened surface, the teeth not penetrating deep or destroying the shape of the hill or row. The benefit of thus loosening the soil is well known, and by the disposition of the teeth on the expanding and contracting wings, as specified, it will be obvious that whatever the width of the furrow or distance of the rows or hills apart this breaking and loosening of the soil will always be made at or near the foot of the hills or rows and in the furrows, thus opening the soil where it is best for the roots of the plants.

I do not claim of themselves the expanding and contracting wings, as such have before been used in corn-plows and cotton-scrapers; but I do claim as new and useful and desire to secure by Letters Patent—

Providing the expanding and contracting hoeing-wings B on either side with cultivator-teeth C, projecting downward on the inside of the hoeing wings or scrapers, as and for the purposes specified.

In testimony whereof I have hereunto subscribed my name.

DANIEL W. SHARES.

Witnesses:
SIDNEY S. BENHAM,
CLEORA GILBERT.